United States Patent
Habib et al.

(10) Patent No.: US 10,481,891 B2
(45) Date of Patent: Nov. 19, 2019

(54) NAVIGATION SYSTEM WITH DYNAMIC APPLICATION EXECUTION MECHANISM AND METHOD OF OPERATION THEREOF

(75) Inventors: Md Ahsan Habib, Santa Clara, CA (US); Hengbin Luo, San Jose, CA (US); Manohar Ellanti, Fremont, CA (US); Matthew Thompson, Woodside, CA (US); James R. Grace, West Bloomfield, MI (US)

(73) Assignee: Telenav, Inc., Santa Clara, CA (US)

( * ) Notice: Subject to any disclaimer, the term of this patent is extended or adjusted under 35 U.S.C. 154(b) by 212 days.

(21) Appl. No.: 13/149,829

(22) Filed: May 31, 2011

(65) Prior Publication Data

US 2011/0296392 A1    Dec. 1, 2011

Related U.S. Application Data

(60) Provisional application No. 61/349,996, filed on May 31, 2010.

(51) Int. Cl.
G06F 8/65       (2018.01)
G01C 21/20      (2006.01)
G06F 9/54       (2006.01)

(52) U.S. Cl.
CPC ............. *G06F 8/65* (2013.01); *G01C 21/20* (2013.01); *G06F 9/54* (2013.01); *G06F 2209/541* (2013.01)

(58) Field of Classification Search
CPC ..... G06F 8/60; G06F 8/67; G06F 8/65; G06F 8/68; G06F 11/1433; G06F 3/0481; G06F 17/30241

USPC ......................................................... 717/168
See application file for complete search history.

(56) References Cited

U.S. PATENT DOCUMENTS

| | | | |
|---|---|---|---|
| 2003/0220947 A1* | 11/2003 | Doui | G06F 8/65 |
| 2004/0056890 A1 | 3/2004 | Hao et al. | |
| 2004/0259542 A1* | 12/2004 | Viitamaki | H04L 12/12 |
| | | | 455/426.2 |
| 2005/0280555 A1 | 12/2005 | Warner, IV | |
| 2007/0156649 A1* | 7/2007 | Fischer | 707/3 |
| 2008/0007120 A1 | 1/2008 | Weyl et al. | |
| 2008/0215240 A1* | 9/2008 | Howard et al. | 701/213 |
| 2009/0299788 A1 | 12/2009 | Huber et al. | |
| 2010/0027521 A1 | 2/2010 | Huber et al. | |
| 2010/0037057 A1* | 2/2010 | Shim et al. | 713/171 |
| 2010/0094878 A1 | 4/2010 | Soroca et al. | |
| 2010/0121567 A1* | 5/2010 | Mendelson | G01C 21/206 |
| | | | 701/467 |
| 2010/0135201 A1* | 6/2010 | Lewis et al. | 370/328 |
| 2010/0318291 A1 | 12/2010 | Gluck | |

(Continued)

OTHER PUBLICATIONS

International Search Report for PCT Application No. PCT/US2011/038649 dated Sep. 28, 2011.

*Primary Examiner* — Bing Zhao
*Assistant Examiner* — Hui-Wen Lin
(74) *Attorney, Agent, or Firm* — Perspectives Law Group, Corp.

(57) ABSTRACT

A method of operation of a navigation system includes: detecting a source application for registering the source application to a target device; generating a first application portion for partitioning the source application for running the first application portion; and operating the first application portion for interacting with the source application for partially controlling an execution of the source application.

25 Claims, 7 Drawing Sheets

(56) References Cited

U.S. PATENT DOCUMENTS

2011/0082746 A1     4/2011   Rice et al.
2011/0263293 A1* 10/2011   Blake .................... B60K 35/00
                                                                                       455/557

\* cited by examiner

NAVIGATION SYSTEM WITH DYNAMIC APPLICATION EXECUTION MECHANISM AND METHOD OF OPERATION THEREOF

CROSS-REFERENCE TO RELATED APPLICATION(S)

This application claims the benefit of U.S. Provisional Patent Application Ser. No. 61/349,996 filed May 31, 2010, and the subject matter thereof is incorporated herein by reference thereto.

TECHNICAL FIELD

The present invention relates generally to a navigation system, and more particularly to a system for application execution.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world". One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, the navigation system without the ability to partition and execute the application has become a paramount concern for the consumer. The inability decreases the benefit of using the tool.

Thus, a need still remains for a navigation system. In view of the ever-increasing commercial competitive pressures, along with growing consumer expectations and the diminishing opportunities for meaningful product differentiation in the marketplace, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: detecting a source application for registering the source application to a target device; generating a first application portion for partitioning the source application for running the first application portion; and operating the first application portion for interacting with the source application for partially controlling an execution of the source application.

The present invention provides a navigation system, including: an application detector module for detecting a source application for registering the source application to a target device; an application generator module, coupled to the application detector module, for generating a first application portion for partitioning the source application for running the first application portion; and an operator module, coupled to the application generator module, for operating the first application portion for interacting with the source application for partially controlling an execution of the source application.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
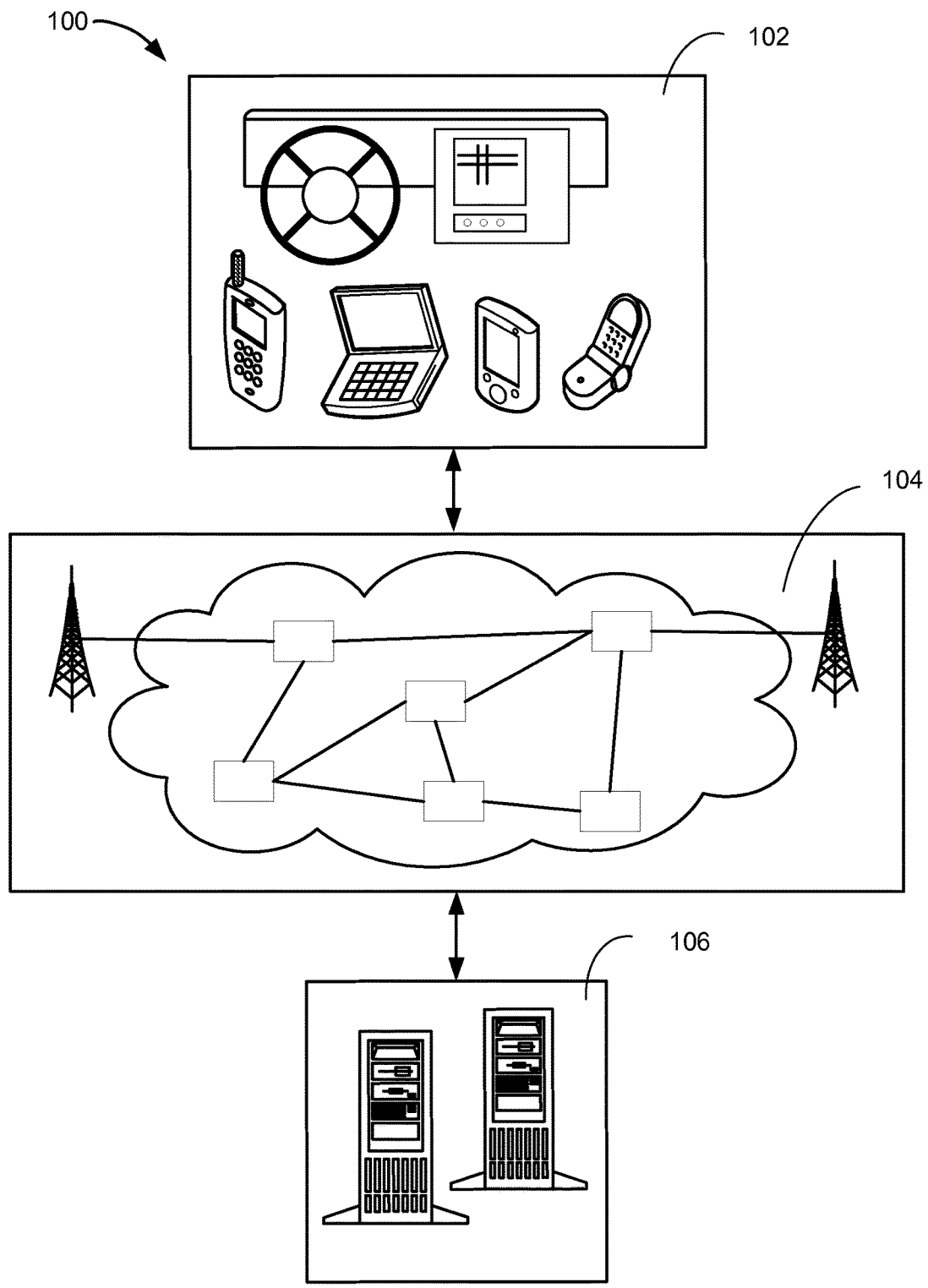
FIG. 1 is a navigation system with dynamic application execution mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein includes software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with dynamic application execution mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, a head unit, automotive telematic navigation system, or other multi-functional mobile communication or entertainment device. The head unit is defined as a component of a stereo system in a vehicle, home cinema system, or a combination thereof which provides a hardware interface for components of an electronic media system. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, a head unit, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
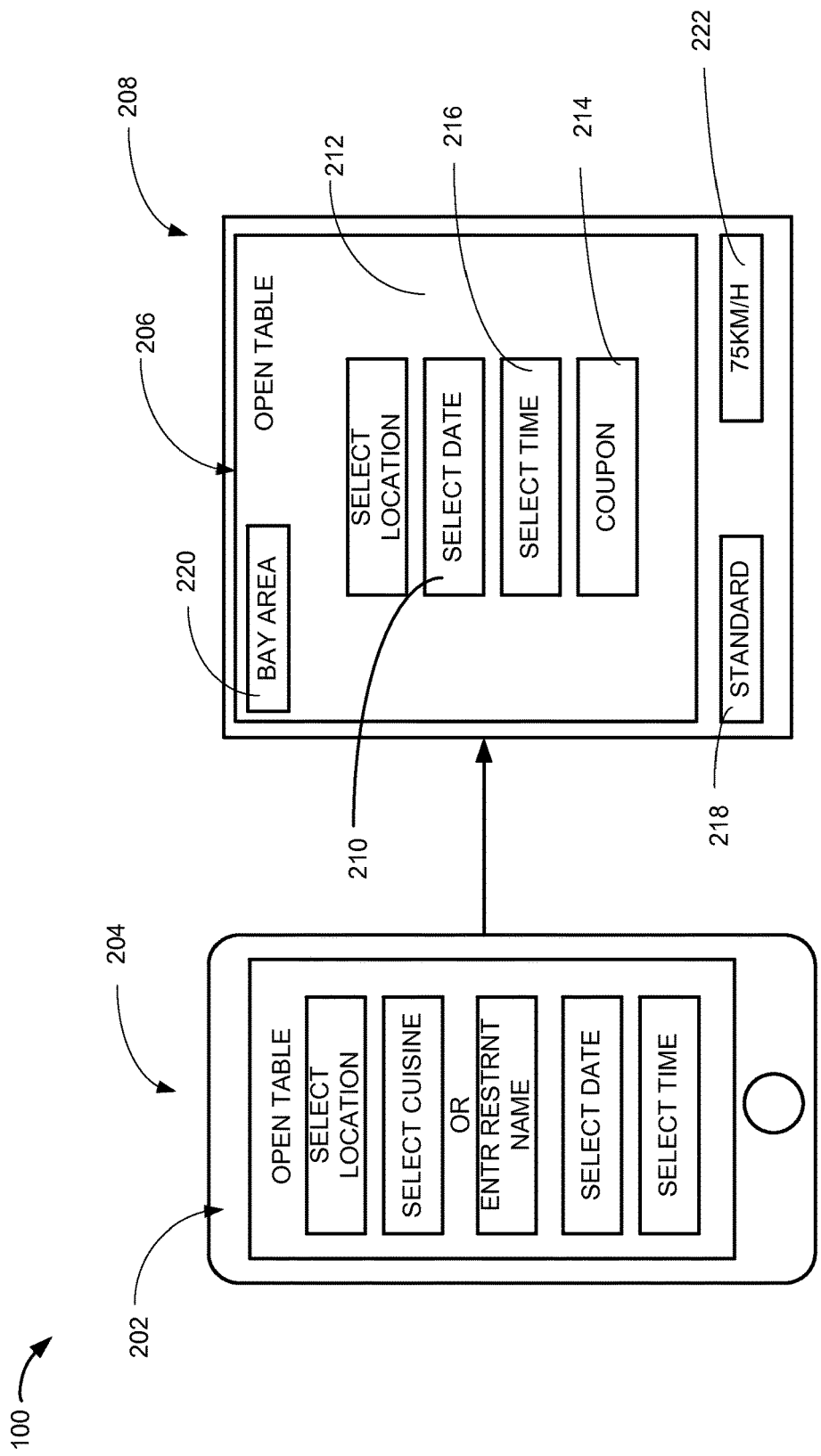
FIG. 2 is an example of the partitioning of a source application running on a source device for running a first application portion on a target device.

Referring now to FIG. 2, therein is shown an example of the partitioning of a source application 202 running on a source device 204 for running a first application portion 206 on a target device 208. The source device 204 is defined as an electronic device that runs the source application 202. For example, the source device 204 can include the first device 102 of FIG. 1.

The source application 202 is defined as the software running on the source device 204. For example, the source application 202 can include the mobile phone application running on the first device 102 representing a smartphone. The application is defined as software running on a hardware, such as an electronic device.

The target device 208 is defined as an electronic device that runs an application partitioned from the source application 202. For example, the target device 208 can run the first application portion 206. For a specific example, the target device 208 can include the second device 106 of FIG. 1 representing a head unit.

The first application portion 206 is defined as the software partitioned from the source application 202 that represents the partial functionality of the source application 202. Furthermore, the first application portion 206 is defined as the application executed by the target device 208 to partially control an execution 210 of the source application 202 partitioned. The functionality is defined as the operational capability of the software. For example, the source device 204, the target device 208, or a combination thereof can generate the first application portion 206.

For example, the source application 202 can represent iPhone™ application for OpenTable™. OpenTable™ is an application that aids the user of the navigation system 100 to find a restaurant, make a reservation at a restaurant, or a combination thereof. The source device 204 can represent an iPhone™. The OpenTable™ application running on the source device 204 can include functionalities, such as "select location," "select cuisine," "select restaurant name," "select date," and "select time." The first application portion 206 can represent the application with the functionalities, such as "select location," "select date," and "select time."

The execution 210 defined as the operation of the application. For example, the execution 210 of the source application 202 can be executed by the source device 204. For another example, the execution 210 of the first application portion 206 can be executed by the target device 208.

For further example, the execution 210 of the first application portion 206 can be dynamic. The execution 210 that is dynamic is defined as the execution 210 that is periodically refreshed continuously. For example, while the navigation system 100 is in operation, the first application portion 206 can be generated periodically, under predefined time period, randomly, as needed, or a combination thereof.

After the first application portion 206 is generated, for example, the source application 202 can include all of the functionalities for the source application 202 as enabled on the source device 204. However, although the execution 210 of the functionalities, such as "select location," "select cuisine," "select restaurant name," "select date," and "select time," can be executed by the source device 204, the execution 210 by the source device 204 depends on the execution 210 of the first application portion 206 by the target device 208. For example, if the first application portion 206 executes the functionalities, such as "select location," "select date," and "select time," the source application 202 cannot execute the functionalities, such as "select location," "select date," and "select time."

Moreover, the execution 210 of the functionalities for the first application portion 206, such as "select location," "select date," and "select time," can be executed by the target device 208. The target device 208 can control the operation of the source application 202 partially by executing the first application portion 206 with the functionalities, such as "select location," "select date," and "select time."

For another example, after first application portion 206 is generated, the source application 202 can have the functionalities partitioned the first application portion 206 as disabled on the source device 204. For example, after the first application portion 206 is generated, the functionalities for "select location," "select date," and "select time" for the source application 202 on the source device 204 can be disabled.

A first application interface 212 is defined as the user interface for interfacing with the first application portion 206 on the target device 208. For example, the first application interface 212 can include the selection choices for "select location," "select date," and "select time."

An application add-on 214 is defined as the application with functionality not included in the source application 202 that was generated on the target device 208 to supplement the first application portion 206. For example, the application add-on 214 representing "coupon" can be added on to the target device 208 supplement the first application portion 206.

A usability 216 is defined as the convenience of using the application. For example, the application add-on 214 can enhance the usability 216 of the first application portion 206, because the added functionality can help the user achieve the benefit otherwise unavailable. For a specific example, the application add-on 214 representing "coupon" can help the user find restaurants that offer discount coupons.

A subscription status 218 is defined as the level of subscription of the user for using the navigation system 100. For example, the higher the subscription status 218, the navigation system 100 can offer more functionality to the user. Details regarding more functionality will be discussed later.

A current location 220 is defined as the present physical location of the navigation system 100. For example, the current location 220 of the navigation system 100 can be the San Francisco, Calif. (CA).

A vehicle speed 222 is defined as the speed that the navigation system 100 is traveling. For example, the navigation system 100 can be traveling at 75 kilometers per hour (KM/H).

Figure 3:
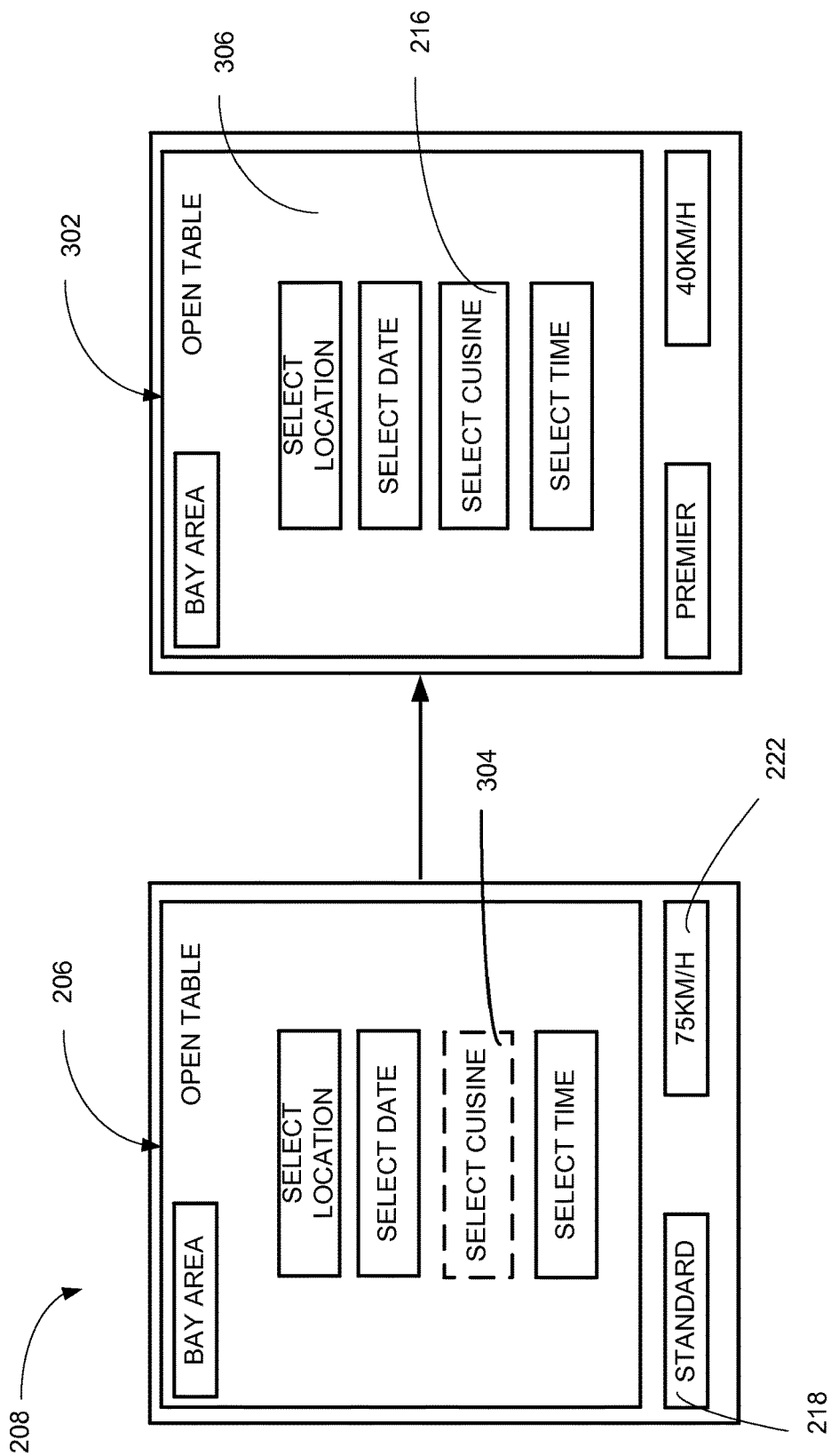
FIG. 3 is an example of the target device updating the first application portion with a second application portion.

Referring now to FIG. 3, therein is shown an example of the target device 208 updating the first application portion 206 with a second application portion 302. The second application portion 302 is defined as the software partitioned from the source application 202 of FIG. 2 that represents the partial functionality of the source application 202. For example, the source device 204 of FIG. 2, the target device 208, or a combination thereof can generate the second application portion 302 to augment the first application portion 206.

For a specific example, the subscription status 218 can be "standard user." The first application portion 206 for the source application 202 representing OpenTable™ can include functionalities, such as "select location," "select date," and "select time" with the subscription status 218 representing "standard user."

If the subscription status 218 changes from "standard user" to "premier user," the target device 208 can update from the first application portion 206 to the second application portion 302 to increase the functionalities. For example, the second application portion 302 can include all the functionalities for the first application portion 206 and an additional functionality representing "select cuisine."

For another example, the vehicle speed 222 can be 75 KM/H. The first application portion 206 for the source application 202 representing OpenTable™ can include the functionalities, such as "select location," "select date," and "select time" when the navigation system 100 is traveling at 75 KM/H.

If the navigation system 100 reduces the vehicle speed 222 to 40 KM/H, the target device 208 can update from the first application portion 206 to the second application portion 302 to increase the usability 216. For example, the second application portion 302 can include all the functionalities for the first application portion 206 and an additional functionality representing "select cuisine." When the vehicle speed 222 is above or below a predefined threshold speed, the target device 208 can add or reduce the functionality by changing the partitioning of the source application 202 for ensuring safety 304.

The safety 304 is defined as the assurance for the user of the navigation system 100 for not being in harm's way. For example, the reduction of the functionality, such as "select cuisine" illustrated with a dotted line, can represent the target device 208 ensuring the safety 304 of the user of the navigation system 100 when the vehicle speed 222 is above a predefined threshold speed.

A second application interface 306 is defined as the user interface for interfacing with the second application portion 302 on the target device 208. For example, the second application interface 306 can represent the user interface for interfacing with the second application portion 302.

Figure 4:
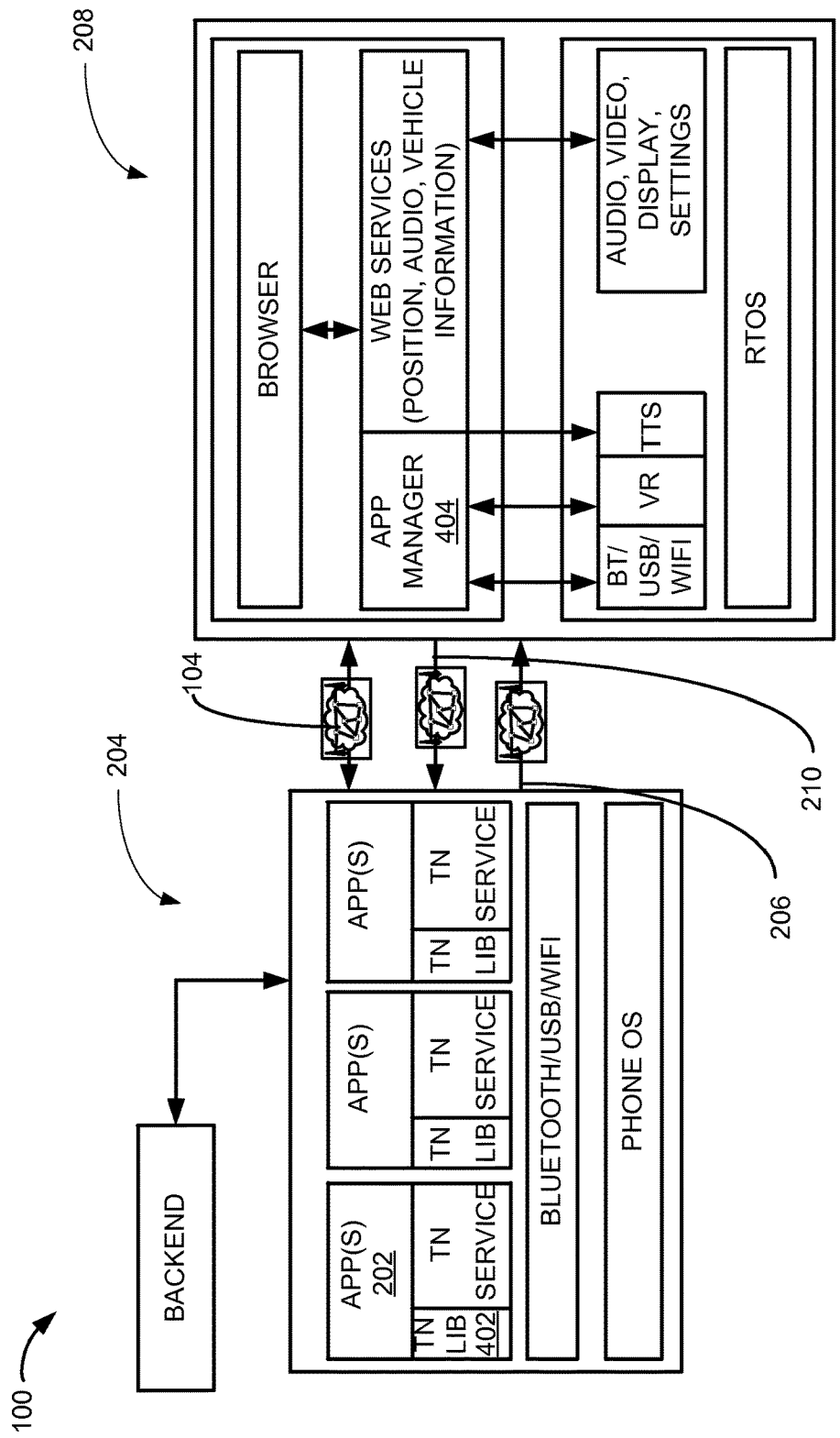
FIG. 4 is an example of a network topology of the communication between the source device and the target device.

Referring now to FIG. 4, therein is shown an example of a network topology of the communication between the source device 204 and the target device 208. For example, the source device 204 and the target device 208 can communicate via the communication path 104.

Furthermore, the source device 204 can send the source application 202 for registering the source application 202 or portion of the source application 202 to the target device 208. The source device 204, the target device 208, or a combination thereof can generate the first application portion 206, the second application portion 302 of FIG. 3, or a combination thereof by partitioning the source application 202.

For a specific example, the source device 204 can include the source application 202 for generating the first application portion 206. The source device 102 can also include an application library 402 to partition the source application 202 for generating the first application portion 206. The application library 402 is defined as the collection of resources, such as classes, subroutines, values, or the application programming interface (API), used to generate the first application portion 206, the second application portion 302, or a combination thereof. The target device 208 can also include the application library 402.

For further example, the target device 208 can include an application manager 404. The application manager 404 is defined as the application for managing the first application portion 206, the second application portion 302, or a combination thereof. For example, if the source device 204 generated and transmitted the first application portion 206, the application manager 404 can manage the registration of the first application portion 206 to the target device 208. The source device 204 can also include the application manager 404.

The source device 204 can include a software development kit (SDK) for generating the first application portion 206, the second application portion 302, or a combination thereof using the application library 402. The execution 210 of the first application portion 206, the second application 302, or a combination thereof can be communicated backed to the source application 202 for partially controlling the source application 202 as discussed in FIG. 2.

Figure 5:
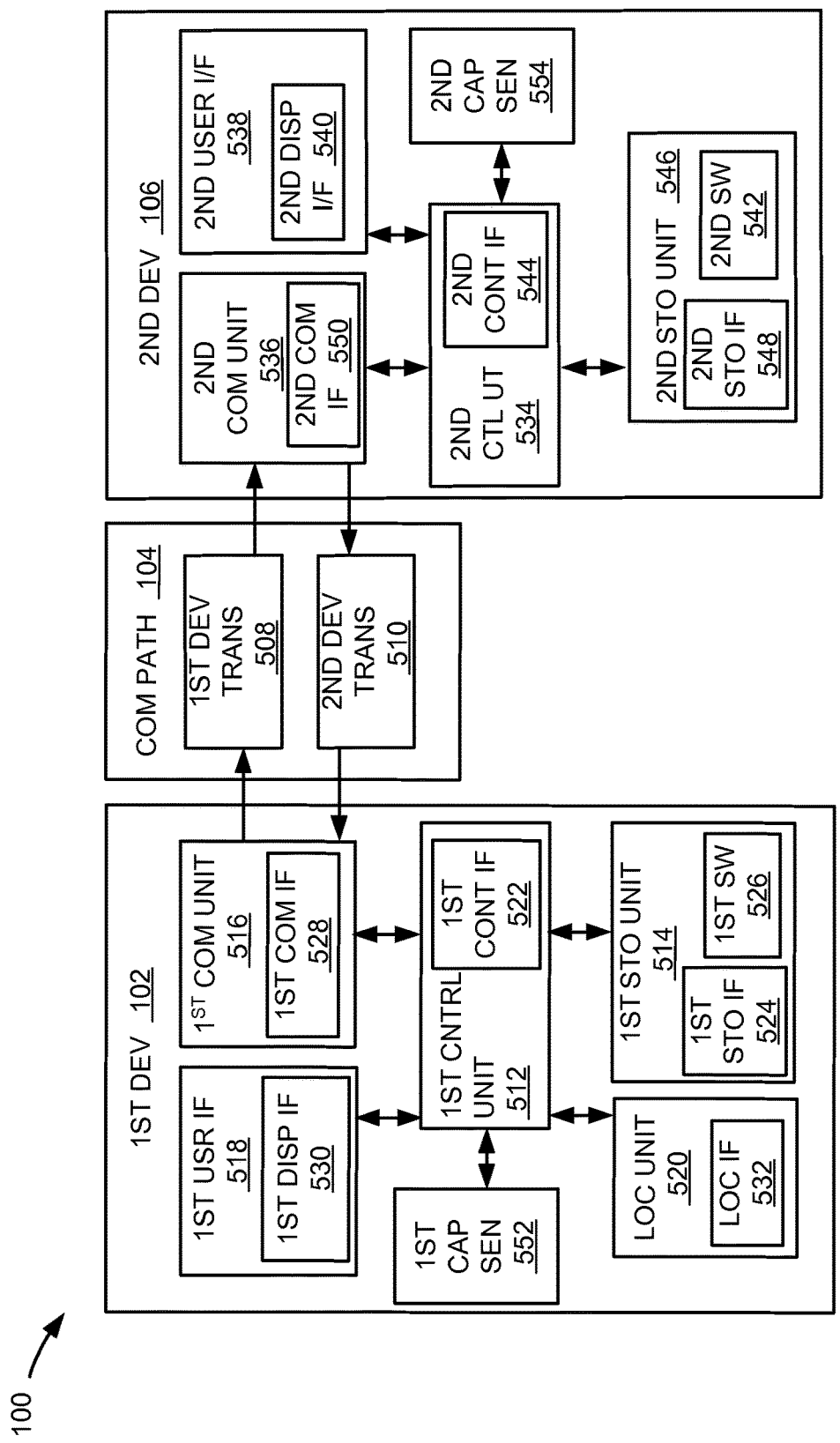
FIG. 5 is an exemplary block diagram of the navigation system.

Referring now to FIG. 5, therein is shown an exemplary block diagram of the navigation system 100. The navigation system 100 can include the first device 102, the communication path 104, and the second device 106. The first device 102 can send information in a first device transmission 508 over the communication path 104 to the second device 106. The second device 106 can send information in a second device transmission 510 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device, such as a smartphone, and the second device 106 will be described as a head unit in a vehicle. The present invention is not limited to this selection for the type of devices. The selection is an example of the present invention.

The first device 102 can include a first control unit 512, a first storage unit 514, a first communication unit 516, a first user interface 518, and a location unit 520. The first control unit 512 can include a first control interface 522. The first control unit 512 can execute a first software 526 to provide the intelligence of the navigation system 100. The first control unit 512 can be implemented in a number of different manners. For example, the first control unit 512 can be a processor, an embedded processor, a microprocessor, a hardware control logic, a hardware finite state machine (FSM), a digital signal processor (DSP), or a combination thereof. The first control interface 522 can be used for communication between the first control unit 512 and other functional units in the first device 102. The first control interface 522 can also be used for communication that is external to the first device 102.

The first control interface 522 can receive information from the other functional units or from external sources, or can transmit information to the other functional units or to external destinations. The external sources and the external destinations refer to sources and destinations external to the first device 102.

The first control interface 522 can be implemented in different ways and can include different implementations depending on which functional units or external units are being interfaced with the first control interface 522. For example, the first control interface 522 can be implemented with a pressure sensor, an inertial sensor, a microelectromechanical system (MEMS), optical circuitry, waveguides, wireless circuitry, wireline circuitry, or a combination thereof.

The location unit 520 can access location information, current heading, and current speed of the first device 102, as examples. The location unit 520 can be implemented in many ways. For example, the location unit 520 can function as at least a part of a global positioning system (GPS), an inertial navigation system, a cellular-tower location system, a pressure location system, or any combination thereof.

The location unit 520 can include a location interface 532. The location interface 532 can be used for communication between the location unit 520 and other functional units in the first device 102. The location interface 532 can also be used for communication that is external to the first device 102.

The location interface 532 can receive information from the other functional units or from external sources, or can transmit information to the other functional units or to external destinations. The external sources and the external destinations refer to sources and destinations external to the first device 102.

The location interface 532 can include different implementations depending on which functional units or external units are being interfaced with the location unit 520. The location interface 532 can be implemented with technologies and techniques similar to the implementation of the first control interface 522.

The first storage unit 514 can store the first software 526. The first storage unit 514 can also store the relevant information, such as advertisements, points of interest (POI), navigation routing entries, or any combination thereof.

The first storage unit 514 can be a volatile memory, a nonvolatile memory, an internal memory, an external memory, or a combination thereof. For example, the first storage unit 514 can be a nonvolatile storage such as non-volatile random access memory (NVRAM), Flash memory, disk storage, or a volatile storage such as static random access memory (SRAM).

The first storage unit 514 can include a first storage interface 524. The first storage interface 524 can be used for communication between the location unit 520 and other functional units in the first device 102. The first storage interface 524 can also be used for communication that is external to the first device 102.

The first storage interface 524 can receive information from the other functional units or from external sources, or can transmit information to the other functional units or to external destinations. The external sources and the external destinations refer to sources and destinations external to the first device 102.

The first storage interface 524 can include different implementations depending on which functional units or external units are being interfaced with the first storage unit 514. The first storage interface 524 can be implemented with technologies and techniques similar to the implementation of the first control interface 522.

The first communication unit 516 can enable external communication to and from the first device 102. For example, the first communication unit 516 can permit the first device 102 to communicate with the second device 106 of FIG. 1, an attachment, such as a peripheral device or a computer desktop, and the communication path 104.

The first communication unit 516 can also function as a communication hub allowing the first device 102 to function as part of the communication path 104 and not limited to be an end point or terminal unit to the communication path 104. The first communication unit 516 can include active and passive components, such as microelectronics or an antenna, for interaction with the communication path 104.

The first communication unit 516 can include a first communication interface 528. The first communication interface 528 can be used for communication between the first communication unit 516 and other functional units in the first device 102. The first communication interface 528 can receive information from the other functional units or can transmit information to the other functional units.

The first communication interface 528 can include different implementations depending on which functional units are being interfaced with the first communication unit 516. The first communication interface 528 can be implemented with technologies and techniques similar to the implementation of the first control interface 522.

The first user interface 518 allows a user (not shown) to interface and interact with the first device 102. The first user interface 518 can include an input device and an output device. Examples of the input device of the first user interface 518 can include a keypad, a touchpad, soft-keys, a keyboard, a microphone, or any combination thereof to provide data and communication inputs.

The first user interface 518 can include a first display interface 530. The first display interface 530 can include a display, a projector, a video screen, a speaker, or any combination thereof.

The first control unit 512 can operate the first user interface 518 to display information generated by the navigation system 100. The first control unit 512 can also execute the first software 526 for the other functionalities of the navigation system 100, including receiving location information from the location unit 520. The first control unit 512 can further execute the first software 526 for interaction with the communication path 104 via the first communication unit 516.

The second device 106 can be optimized for implementing the present invention in a multiple device embodiment with the first device 102. The second device 106 can provide the additional or higher performance processing power compared to the first device 102. The second device 106 can include a second control unit 534, a second communication unit 536, and a second user interface 538.

The second user interface 538 allows a user (not shown) to interface and interact with the second device 106. The second user interface 538 can include an input device and an output device. Examples of the input device of the second user interface 538 can include a keypad, a touchpad, soft-keys, a keyboard, a microphone, or any combination thereof to provide data and communication inputs. Examples of the output device of the second user interface 538 can include a second display interface 540. The second display interface 540 can include a display, a projector, a video screen, a speaker, or any combination thereof.

The second control unit 534 can execute a second software 542 to provide the intelligence of the second device 106 of the navigation system 100. The second software 542 can operate in conjunction with the first software 526. The second control unit 534 can provide additional performance compared to the first control unit 512.

The second control unit 534 can operate the second user interface 538 to display information. The second control unit 534 can also execute the second software 542 for the other functions of the navigation system 100, including operating the second communication unit 536 to communicate with the first device 102 over the communication path 104.

The second control unit 534 can be implemented in a number of different manners. For example, the second control unit 534 can be a processor, an embedded processor, a microprocessor, a hardware control logic, a hardware finite state machine (FSM), a digital signal processor (DSP), or a combination thereof.

The second control unit 534 can include a second controller interface 544. The second controller interface 544 can be used for communication between the second control unit 534 and other functional units in the second device 106. The second controller interface 544 can also be used for communication that is external to the second device 106.

The second controller interface 544 can receive information from the other functional units or from external sources, or can transmit information to the other functional units or to external destinations. The external sources and the external destinations refer to sources and destinations external to the second device 106.

The second controller interface 544 can be implemented in different ways and can include different implementations depending on which functional units or external units are being interfaced with the second controller interface 544. For example, the second controller interface 544 can be implemented with a pressure sensor, an inertial sensor, a microelectromechanical system (MEMS), optical circuitry, waveguides, wireless circuitry, wireline circuitry, or a combination thereof.

A second storage unit 546 can store the second software 542. The second storage unit 546 can also store the relevant information, such as advertisements, points of interest (POI), navigation routing entries, or any combination thereof. The second storage unit 546 can be sized to provide the additional storage capacity to supplement the first storage unit 514.

For illustrative purposes, the second storage unit 546 is shown as a single element, although it is understood that the second storage unit 546 can be a distribution of storage elements. Also for illustrative purposes, the navigation system 100 is shown with the second storage unit 546 as a single hierarchy storage system, although it is understood that the navigation system 100 can have the second storage unit 546 in a different configuration. For example, the second storage unit 546 can be formed with different storage technologies forming a memory hierarchal system including different levels of caching, main memory, rotating media, or off-line storage.

The second storage unit 546 can be a volatile memory, a nonvolatile memory, an internal memory, an external memory, or a combination thereof. For example, the second storage unit 546 can be a nonvolatile storage such as non-volatile random access memory (NVRAM), Flash memory, disk storage, or a volatile storage such as static random access memory (SRAM).

The second storage unit 546 can include a second storage interface 548. The second storage interface 548 can be used for communication between the location unit 520 and other functional units in the second device 106. The second storage interface 548 can also be used for communication that is external to the second device 106.

The second storage interface 548 can receive information from the other functional units or from external sources, or can transmit information to the other functional units or to external destinations. The external sources and the external destinations refer to sources and destinations external to the second device 106.

The second storage interface 548 can include different implementations depending on which functional units or external units are being interfaced with the second storage unit 546. The second storage interface 548 can be implemented with technologies and techniques similar to the implementation of the second controller interface 544.

The second communication unit 536 can enable external communication to and from the second device 106. For example, the second communication unit 536 can permit the second device 106 to communicate with the first device 102 over the communication path 104.

The second communication unit 536 can also function as a communication hub allowing the second device 106 to function as part of the communication path 104 and not limited to be an end point or terminal unit to the communication path 104. The second communication unit 536 can include active and passive components, such as microelectronics or an antenna, for interaction with the communication path 104.

The second communication unit 536 can include a second communication interface 550. The second communication interface 550 can be used for communication between the second communication unit 536 and other functional units in the second device 106. The second communication interface 550 can receive information from the other functional units or can transmit information to the other functional units.

The second communication interface 550 can include different implementations depending on which functional units are being interfaced with the second communication unit 536. The second communication interface 550 can be implemented with technologies and techniques similar to the implementation of the second controller interface 544.

The first communication unit 516 can couple with the communication path 104 to send information to the second device 106 in the first device transmission 508. The second device 106 can receive information in the second communication unit 536 from the first device transmission 508 of the communication path 104.

The second communication unit 536 can couple with the communication path 104 to send information to the first device 102 in the second device transmission 510. The first device 102 can receive information in the first communication unit 516 from the second device transmission 510 of the communication path 104. The navigation system 100 can be executed by the first control unit 512, the second control unit 534, or a combination thereof.

A first capturing sensor 552 can capture the movement of the vehicle. For example, the first capturing sensor 552 can capture the vehicle changing lanes, progressing forward, or a combination thereof. For a specific example, the first capturing sensor 552 can be an accelerometer.

A second capturing sensor 554 can capture the movement of the vehicle. For example, the second capturing sensor 554 can capture the vehicle changing lanes, progressing forward, or a combination thereof. For a specific example, the second capturing sensor 554 can be an accelerometer.

For illustrative purposes, the second device 106 is shown with the partition having the second user interface 538, the second storage unit 546, the second control unit 534, and the second communication unit 536, although it is understood that the second device 106 can have a different partition. For example, the second software 542 can be partitioned differently such that some or all of its function can be in the second control unit 534 and the second communication unit 536. Also, the second device 106 can include other functional units not shown in FIG. 5 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 520, although it is understood that the second device 106 can also operate the location unit 520.

Figure 6:
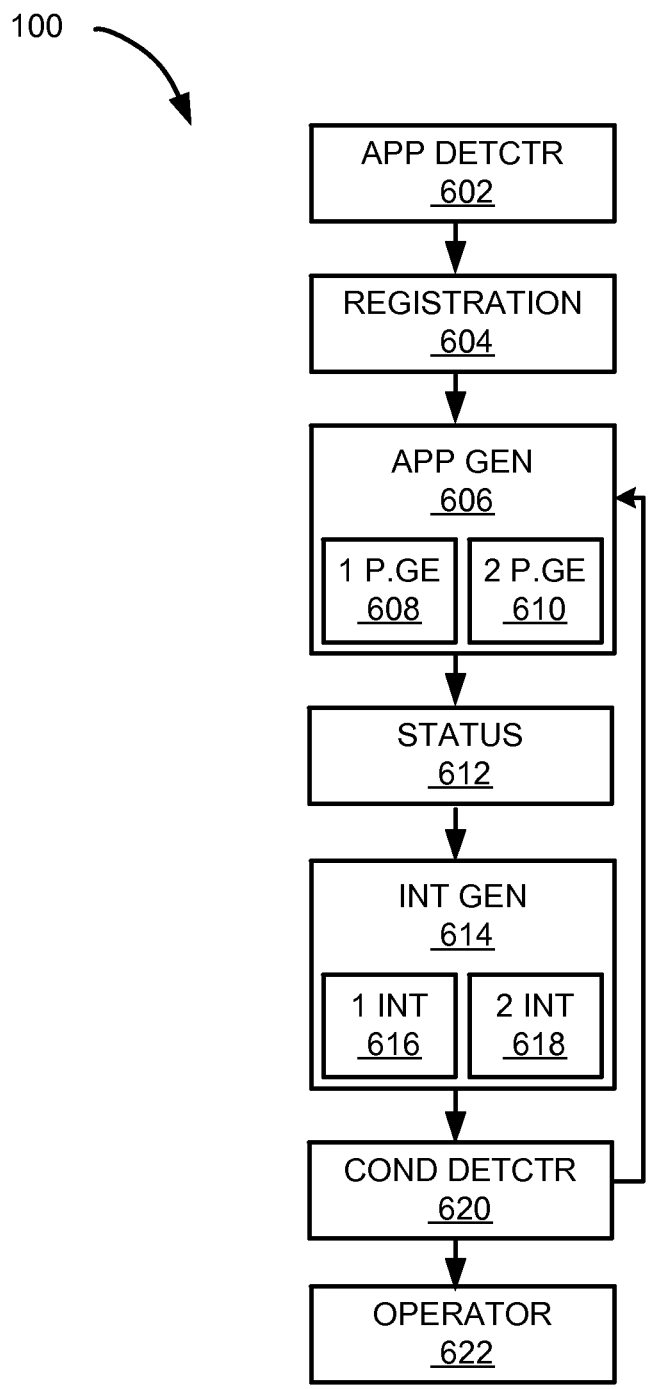
FIG. 6 is a control flow of the navigation system.

Referring now to FIG. 6, therein is shown a control flow of the navigation system 100. The navigation system 100 can include an application detector module 602. The application detector module 602 detects the application running on the source device 204 of FIG. 2 that will be partitioned. For example, the application detector module 602 can detect the source application 202 of FIG. 2 for registering the source application 202 to the target device 208 of FIG. 2.

The application detector module 602 can detect in a number of ways. For example, the application detector module 602 can detect the source application 202 by detecting APIs available for the source application 202 on the source device 204. For another example, the source device 204 can share the source application 202 to the target device 208 by transmitting the source application 202 offered for sharing. The application detector module 602 can detect the source application 202 by receiving the transmission of the source application 202.

For another example, the application detector module 602 can detect the first application portion 206 of FIG. 2 already present in the target device 208. For a different example, the application detector module 602 can detect the first application portion 206, the second application portion 302 of FIG. 3, or a combination thereof that has already been generated and transmitted by the source device 204.

The navigation system 100 can include a registration module 604. The registration module 604 registers the source application 202 for generating the first application portion 206 of FIG. 2, the second application portion 302 of FIG. 3, or a combination thereof. For example, the registration module 604 can register the source application 202 to the target device 208. For a different example, the registration module 604 can register the first application portion 206, the second application portion 302, or a combination thereof that has already been generated and transmitted by the source device 204 to the target device 208. For a specific example, the registration module 604 can register the source application 202, the first application portion 206, the second application portion 302, or a combination thereof with the application manager 404 of FIG. 4. The application manager 404 can manage the source application 202 registered to the target device 208 for the generation of the first application portion 206, the second application portion 302, or a combination thereof.

The navigation system 100 can include an application generator module 606. The application generator module 606 generates the portion of the application partitioned from the source application 202. The application generator module 606 includes a first portion generator module 608 and a second portion generator module 610. Details regarding the second portion generator module 610 will be discussed later.

The first portion generator module 608 generates the first application portion 206. For example, the first portion generator module 608 can generate the first application portion 206 for partitioning the source application 202 for running the first application portion 206 on the target device 208.

The first portion generator module 608 can generate in a number of ways. For example, the first portion generator module 608 can partition the source application 202. The partitioning of the source application 202 can be done by partitioning the functionalities of the source application 202.

For a specific example, the source application 202 can represent the OpenTable™ application discussed previously. The source application 202 can include varieties of functionality. Some of the examples of the functionality can include cuisine selection, navigation to the target restaurant, and reservation of the restaurant. The first portion generator module 608 can generate the first application portion 206 by partitioning the navigation functionality from the source application 202.

For a different example, the first portion generator module 608 can generate the first application portion 206 based on the APIs for the source application 202 and the application library 402 of FIG. 4. The first portion generator module 608 can include the SDK to build the first application portion 206. The first portion generator module 608 can assemble the APIs and the application library 402 to develop the first application portion 206.

It has been discovered that the present invention provides the navigation system 100 with the flexibility to partition the source application 202 to generate the first application portion 206. The flexibility allows the navigation system 100 to select the functionality desired. Furthermore, by generating the first application portion 206 and running the first application portion 206 on the target device 208, the navigation system 100 can allocate the resource used for running the source application 202. As a result, the flexibility allows better use of resources for using both of the source device 204 and the target device 208, thus, improving efficiency and productivity for the safer operation of the navigation system 100.

The navigation system 100 can include a status module 612. The status module 612 determines the subscription status 218 of FIG. 2 of the user of the navigation system 100. For example, the status module 612 can determine the subscription status 218 for modifying the usability 216 of FIG. 2 of the source application 202.

For a specific example, the user of the navigation system 100 can register to the commercial entity offering the benefits of the present invention. The registration to the commercial entity can grant the user with different levels of the subscription status 218. Based on the registration, the status module 612 can determine the subscription status 218.

The navigation system 100 can include an interface generator module 614. The interface generator module 614 generates the user interface for interfacing with the first application portion 206, the second application portion 302, or a combination thereof. The interface generator module 614 includes a first interface module 616 and a second interface module 618. The details regarding the second interface module 618 will be discussed later.

The first interface module 616 generates the first application interface 212 of FIG. 2. For example, the first interface module 616 can generate the first application interface 212 based on the first application portion 206 for ensuring the usability 216 of the source application 202. For a specific example, the first interface module 616 can generate the first application based on the APIs provided for the first application portion 206.

The navigation system 100 can include a condition detector module 620. The condition detector module 620 detects the location information, such as the speed that the navigation system 100 is traveling, the current location 220 of the navigation system 100, or a combination thereof.

For example, the condition detector module 620 can detect the vehicle speed 222 of FIG. 2 for modifying the usability 216 of the source application 202. For another example, the condition detector module 620 can detect the current location 220 for modifying the usability 216 of the source application 202. The condition detector module 620 can detect the vehicle speed 222, the current location 220, or a combination thereof via the location unit 520 of FIG. 5.

The navigation system 100 can include an operator module 622. The operator module 622 operates the first application portion 206 by executing the first application portion 206. For example, the operator module 622 can operate the first application portion 206 for interfacing with the source application 202 from the target device 208 for partially controlling the execution 210 of the source application 202. For example, the operator module 622 can deny the execution 210 of the functionality of the source application 202 that exists on the first application portion 206 by the source device 204 for partially controlling the execution 210 of the source application 202. In contrast, the operator module 622 can permit the execution 210 of the source application 202 for the functionality excluded from the first application portion 206.

For illustrative purposes, the navigation system 100 is described with the application generator module 606 generating the first application portion 206, although the application generator module 606 can operate differently. For example, the application generator module 606 can update the first application portion 206 for improving the usability 216 of the source application 202.

The application generator module 606 can update the first application portion 206 in a number of ways. As discussed previously, the application generator module 606 includes the first portion generator module 608.

For example, the first portion generator module 608 can update the first application portion 206 based on the current location 220 for modifying the usability 216 of the source application 202. Initially, the current location 220 can be in an urban area, such as the San Francisco, Calif. Subsequently, the navigation system 100 can travel to a rural area, such as Placerville, Calif. The source application 202 can represent OpenTable™. The first portion generator module 608 can update the first application portion 206 by generating the first application portion 206 without the functionality for selecting location. Unlike the San Francisco, which is made up by multiple named neighborhoods, such as Soma and Marina, Placerville is not made up by multiple named neighborhoods. Therefore, the first portion generator module 608 can update the first application portion 206 without the location selecting functionality for a particular city.

For another example, the first portion generator module 608 can update the first application portion 206 based on the subscription status 218 for controlling the first application portion 206 generated. For example, as illustrated in FIG. 3, the subscription status 218 can change from "standard status" to "premier status." The first portion generator module 608 can update the first application portion 206 by generating the first application portion 206 with more functionality based on the upgrade of the subscription status 218.

For another example, the first portion generator module 608 can update the first application portion 206 based on the vehicle speed 222 for ensuring the safety 304 of FIG. 3 for controlling the target device 208. For example, as illustrated in FIG. 3, the vehicle speed 222 can change from 75 KM/H to 40 KM/H. The first portion generator module 608 can update the first application portion 206 by generating the first application portion 206 with more functionality based on the reduction of the vehicle speed 222.

As discussed previously, the application generator module 606 includes the second portion generator module 610. The second portion generator module 610 generates the second application portion 302. For example, the second portion generator module 610 can generate the second application portion 302 for augmenting the first application portion 206.

The second portion generator module 610 can generate the second application portion 302 in a number of ways. For example, the second portion generator module 610 can generate the second application portion 302 similarly to the first portion generator module 608 generating the first application portion 206. For a specific example, the second portion generator module 610 can generate the second application portion 302 based on the subscription status 218, the vehicle speed 222, or a combination thereof. For another example, the second portion generator module 610 can generate the second application portion 302 based on the current location 220 for modifying the usability 216 of the source application 202.

It has been discovered that the present invention provides the navigation system 100 with the ability to improve the usability 216 of the source application 202 by updating the first application portion 206, generating the second application portion 302, or a combination thereof. As the navigation system 100 travels along in a geographic area, the location information surrounding the geographic area changes. The ability to improve the usability 216 enhances the efficiency and productivity for using the navigation system 100. Furthermore, changing the functionality available based on the vehicle speed 222 aids to ensure that the safety 304 of the user so that the safety 304 of the user will not be compromised. Thus, the ability to improve the usability 216 leads to the safer operation of the navigation system 100.

For illustrative purposes, the navigation system 100 is described with the application generator module 606 updating the first application portion 206, although the application generator module 606 can operate differently. For example, the application generator module 606 can generating an application add-on 214 of FIG. 2 with the application add-on 214 originating independently from the source application 202 for improving the source application 202 on the target device 208.

The application generator module 606 can generate the application add-on 214 in a number of ways. For example, the application generator module 606 can include APIs for other software different from the source application 202. For another example, the application generator module 606 can download the APIs via the first control interface 522 of FIG. 5 from external sources. The application generator module 606 can assemble the APIs to generate the application add-on 214 with functionalities that do not exist on the source application 202.

It has been discovered that the present invention provides the navigation system 100 with the ability to enhance the functionality of the source application 202 by generating the application add-on 214. The generation of the application add-on 214 offers functionalities unavailable on the source application 202. The availability of the application add-on 214 enhances the usability 216 of the first application portion 206 and the target device 204. As a result, the efficiency and productivity of the user improves, thus, leading to a safer operation of the navigation system 100.

For illustrative purposes, the navigation system 100 is described with the interface generator module 614 generating the first application interface 212, although the interface generator module 614 can operate differently. For example, the interface generator module 614 can generate the second application interface 306 based on the second application portion 302 for replacing the first application interface 212. For a specific example, the second interface module 618 can generate the second application interface 306 similarly to the first interface module 616 generating the first application interface 212.

For illustrative purposes, the navigation system 100 is described with the operator module 622 operating the first application portion 206, although the operator module 622 can operate differently. For example, the operator module 622 can operate the second application portion 302 similarly to the operation of the first application portion 206.

The physical transformation from generating the first application portion 206 results in the physical world, such as people using the target device 208, the vehicle, or a combination thereof, based on the operation of the navigation system 100. As the movement in the physical world occurs, the movement itself creates additional information that is converted back to the generation of the second application portion 302 or updating the first application portion 206 for the continued operation of the navigation system 100 and to continue the movement in the physical world.

FIG. 5 can represent the hardware block diagram for implementing the navigation system 100 on the first device 102 of FIG. 5, the second device 106 of FIG. 5, or a combination thereof. The first device 102, the second device 106, or a combination thereof can include a specialized hardware functional unit to implement the navigation system 100. Each of the modules in the first device 102, the second device 106, or a combination thereof can represent a hardware block for implementing the navigation system 100.

FIG. 5 can represent the software block diagram for implementing the navigation system 100 on the first device 102, the second device 106, or a combination thereof. The first software 526 of FIG. 5 of the first device 102 can include the navigation system 100. For example, the first software 526 can include the application detector module 602, the registration module 604, the application generator module 606, the status module 612, the interface generator module 614, the condition detector module 620, and the operator module 622.

The first control unit 512 of FIG. 5 can execute the first software 526 for the application detector module 602 to detect the source application 202. The first control unit 512 can execute the first software 526 for the registration module 604 to register the source application 202.

The first control unit 512 can execute the first software 526 for the application generator module 606 to generate the first application portion 206, the second application portion 302, or a combination thereof. The first control unit 512 can execute the first software 526 for the status module 612 to determine the subscription status 218. The first control unit 512 can execute the first software 526 for the interface generator module 614 to generate the first application interface 212, the second application interface 306, or a combination thereof.

The first control unit 512 can execute the first software 526 for the condition detector module 620 to detect the current location 220, the vehicle speed 222, or a combination thereof. The first control unit 512 can execute the first software 526 for the operator module 622 to operate the first application portion 206, the second application portion 302, or a combination thereof.

The second software 542 of FIG. 5 of the second device 106 can include the navigation system 100. For example, the second software 542 can include the application detector module 602, the registration module 604, the application generator module 606, the status module 612, the interface generator module 614, the condition detector module 620, and the operator module 622.

The second control unit 534 of FIG. 5 can execute the second software 542 for the application detector module 602 to detect the source application 202. The second control unit 534 can execute the second software 542 for the registration module 604 to register the source application 202.

The second control unit 534 can execute the second software 542 for the application generator module 606 to generate the first application portion 206, the second application portion 302, or a combination thereof. The second control unit 534 can execute the second software 542 for the status module 612 to determine the subscription status 218. The second control unit 534 can execute the second software 542 for the interface generator module 614 to generate the first application interface 212, the second application interface 306, or a combination thereof.

The second control unit 534 can execute the second software 542 for the condition detector module 620 to detect the current location 220, the vehicle speed 222, or a combination thereof. The second control unit 534 can execute the second software 542 for the operator module 622 to operate the first application portion 206, the second application portion 302, or a combination thereof.

The navigation system 100 can be partitioned between the first software 526 and the second software 542. For example, the second software 542 can include the registration module 604, the application generator module 606, the status module 612, the interface generator module 614, the condition detector module 620, and the operator module 622. The second control unit 534 can execute modules partitioned on the second software 542 as previously described.

The first software 526 can include the application detector module 602. Based on the size of the first storage unit 514 of FIG. 5, the first software 526 can include additional modules of the navigation system 100. The first control unit 512 can execute the modules partitioned on the first software 526 as previously described.

The first user interface 518 of FIG. 5 can receive the input into the first application interface 212, the second application interface 306, or a combination thereof by the user, the navigation system 100, or a combination thereof. The first control unit 512 can operate the first communication unit 516 to send the source application 202 to the second device 106. The first control unit 512 can operate the first software 526 to operate the location unit 520. The second communication unit 536 of FIG. 5 can send the execution 210 to the first device 102 through the communication path 104 of FIG. 5.

It has been discovered that the present invention provides the navigation system 100 with the ability to dynamically execute the application on multiple electronic devices. The generation of the first application portion 206, the second application portion 302, or a combination thereof based on the source application 202 allows the navigation system 100 to allocate resources to execute the source application 202. Furthermore, the ability to update the first application portion 206 and generate the second application portion 302 enhances the usability 216 of the source application 202 by selectively choosing the functionality desired to be running on multiple numbers of the target device 208. As a result, the ability to dynamically execute the application can enhance efficiency and productivity from using the source application 202, thus, leading to the safer operation of the navigation system 100.

The navigation system 100 describes the module functions or order as an example. The modules can be partitioned differently. For example, the first portion generator module 608 and the second portion generator module 610 can be combined. Each of the modules can operate individually and independently of the other modules.

Furthermore, data generated in one module can be used by another module without being directly coupled to each other. For example, the interface generator module 614 can receive the first application portion 206 from the application generator module 606.

Figure 7:
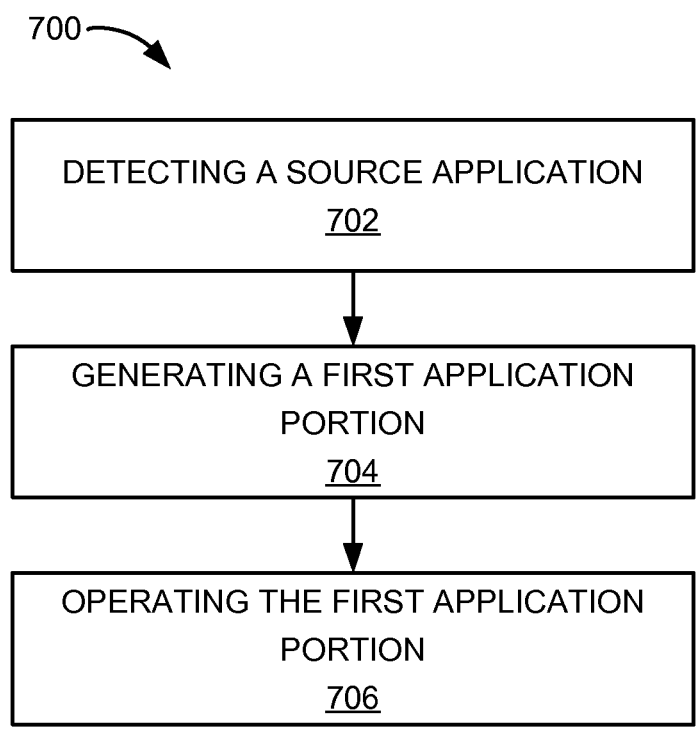
FIG. 7 is a flow chart of a method of operation of the navigation system in a further embodiment of the present invention.

Referring now to FIG. 7, therein is shown a flow chart of a method 700 of operation of the navigation system 100 in a further embodiment of the present invention. The method 700 includes: detecting a source application for registering the source application to a target device in a block 702; generating a first application portion for partitioning the source application for running the first application portion in a block 704; and operating the first application portion for interacting with the source application for partially controlling an execution of the source application in a block 706.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
    detecting a source application with a control unit for registering the source application running on a source device to a target device;
    detecting whether a first application portion has already been generated or not for registering the first application portion on the target device;
    generating the first application portion under as needed basis to include a functionality partitioned from the source application based on the first application portion for registering for running the first application portion executed by the target device;
    generating a second application portion under a predefined time period to include an additional functionality partitioned from the same instance of the source application wherein the additional functionality of the second application portion is partitioned differently from the functionality of the first application portion;
    operating the first application portion or the second application portion for disabling the functionality or the additional functionality, respectively, partitioned originally operational on the source application on the source device while the first application portion or the second application portion executes the functionality or the additional functionality, respectively, partitioned to the target device for partially controlling an execution of the source application;
    updating by selecting the first application portion or the second application portion based on a current location for changing a usability of the source application wherein the second application portion includes the functionality of the first application portion in addition to the additional functionality unavailable on the first application portion; and
    generating an application add-on with the application add-on originating independently from the source application for improving the source application on the target device.

2. The method as claimed in claim 1 further comprising updating the first application portion for improving the source application.

3. The method as claimed in claim 1 further comprising generating the second application portion for augmenting the first application portion.

4. The method as claimed in claim 1 further comprising generating a first application interface based on the first application portion for ensuring the usability of the source application.

5. The method as claimed in claim 1 further comprising:
    generating the second application portion for augmenting the first application portion; and
    generating a second application interface based on the second application portion for replacing a first application interface.

6. A method of operation of a navigation system comprising:
    detecting a source application with a control unit for registering the source application running on a source device to a target device;
    detecting whether a first application portion has already been generated or not for registering the first application portion on the target device;
    generating a second application portion under a predefined time period to include an additional functionality partitioned from the same instance of the source application wherein the additional functionality of the second application portion is partitioned differently from the functionality of the first application portion;
    operating the first application portion or the second application portion for disabling the functionality or the additional functionality, respectively, partitioned originally operational on the source application on the source device while the first application portion or the second application portion executes the functionality or the additional functionality, respectively, partitioned to the target device for partially controlling an execution of the source application;
    updating by selecting the first application portion or the second application portion based on a current location for changing a usability of the source application wherein the second application portion includes the functionality of the first application portion in addition to the additional functionality unavailable on the first application portion; and
    generating an application add-on with the application add-on originating independently from the source application for improving the source application on the target device.

7. The method as claimed in claim 6 further comprising updating the first application portion based on the current location for modifying the usability of the source application.

8. The method as claimed in claim 6 further comprising generating the second application portion based on the current location for modifying the usability of the source application.

9. The method as claimed in claim 6 further comprising:
determining a subscription status for modifying the usability of the source application; and
updating the first application portion based on the subscription status for controlling the first application portion generated.

10. The method as claimed in claim 6 further comprising:
determining a subscription status for modifying the usability of the source application; and
generating the second application portion based on the subscription status for replacing the first application portion.

11. The method as claimed in claim 6 further comprising:
detecting a vehicle speed for modifying the usability of the source application; and
updating the first application portion based on the vehicle speed for ensuring safety for controlling the target device.

12. The method as claimed in claim 6 further comprising:
detecting a vehicle speed for modifying the usability of the source application; and
generating the second application portion based on the vehicle speed for replacing the first application portion.

13. A navigation system comprising:
a control unit including a processor for:
detecting a source application for registering the source application running on a source device to a target device,
detecting whether a first application portion has already been generated or not for registering the first application portion on the target device;
generating a first application portion under as needed basis to include a functionality partitioned from the source application based on the first application portion for registering for running the first application portion executed by the target device,
generating a second application portion under a predefined time period to include an additional functionality partitioned from the same instance of the source application wherein the additional functionality of the second application portion is partitioned differently from the functionality of the first application portion,
operating the first application portion or the second application portion for disabling the functionality or the additional functionality, respectively, partitioned originally operational on the source application on the source device while the first application portion or the second application portion executes the functionality or the additional functionality, respectively, partitioned to the target device for partially controlling an execution of the source application,
updating by selecting the first application portion or the second application portion based on a current location for changing a usability of the source application wherein the second application portion includes the functionality of the first application portion in addition to the additional functionality unavailable on the first application portion,
generating an application add-on with the application add-on originating independently from the source application for improving the source application on the target device; and
a communication unit including a microelectronic, coupled to the control unit, for sending the execution to a device.

14. The system as claimed in claim 13 wherein the control unit is for updating the first application portion for improving the usability of the source application.

15. The system as claimed in claim 13 wherein the control unit is for generating the second application portion for replacing the first application portion.

16. The system as claimed in claim 13 wherein the control unit is for generating a first application interface based on the first application portion for ensuring the usability of the source application.

17. The system as claimed in claim 13 wherein the control unit is for:
generating the second application portion for replacing the first application portion; and
generating a second application interface based on the second application portion for replacing a first application interface.

18. The system as claimed in claim 13 wherein the control unit is for generating an application add-on for enhancing the usability of the source application on the target device.

19. The system as claimed in claim 13 wherein the control unit is for:
generating a first application portion for partitioning the source application for running the first application portion on the target device; and
operating the application portion for interacting with the source application from the target device for partially controlling an execution of the source application.

20. The system as claimed in claim 19 wherein the control unit is for updating the first application portion based on the current location for modifying the usability of the source application.

21. The system as claimed in claim 19 wherein the control unit is for generating the second application portion based on the current location for modifying the usability of the source application.

22. The system as claimed in claim 19 wherein the control unit is for:
determining a subscription status for modifying the usability of the source application; and
updating the first application portion based on the subscription status for controlling the first application portion generated.

23. The system as claimed in claim 19 wherein the control unit is for:
determining a subscription status for modifying the usability of the source application; and
generating the second application portion based on the subscription status for replacing the first application portion.

24. The system as claimed in claim 19 wherein the control unit is for:
detecting a vehicle speed for modifying the usability of the source application; and
updating the first application portion based on the vehicle speed for ensuring safety for controlling the target device.

25. The system as claimed in claim 19 wherein the control unit is for:
detecting a vehicle speed for modifying the usability of the source application; and
for generating the second application.

* * * * *